US012454651B2

(12) United States Patent
Zhao et al.

(10) Patent No.: US 12,454,651 B2
(45) Date of Patent: Oct. 28, 2025

(54) METHOD FOR REGULATING QUALITY OF OIL DERIVED FROM PLASTIC WASTES BY SUPERCRITICAL HYDROTHERMAL LIQUEFACTION

(71) Applicant: China University of Mining and Technology, Xuzhou (CN)

(72) Inventors: Peitao Zhao, Xuzhou (CN); Yikun Xu, Xuzhou (CN); Binbin Fu, Xuzhou (CN); Guangchao Jia, Xuzhou (CN); Didi Gai, Xuzhou (CN); Yuqian Zhong, Xuzhou (CN)

(73) Assignee: China University of Mining and Technology, Xuzhou (CN)

( * ) Notice: Subject to any disclaimer, the term of this patent is extended or adjusted under 35 U.S.C. 154(b) by 244 days.

(21) Appl. No.: 18/364,282

(22) Filed: Aug. 2, 2023

(65) Prior Publication Data

US 2024/0043756 A1    Feb. 8, 2024

(30) Foreign Application Priority Data

Aug. 2, 2022    (CN) .......................... 202210918980.8

(51) Int. Cl.
*C10G 11/02*    (2006.01)
*B01J 23/70*    (2006.01)
(Continued)

(52) U.S. Cl.
CPC ............... *C10G 11/02* (2013.01); *B01J 23/78* (2013.01); *B01J 37/03* (2013.01);
(Continued)

(58) Field of Classification Search
None
See application file for complete search history.

(56) References Cited

U.S. PATENT DOCUMENTS 10,894,870 B2 *    1/2021    Chen .................. B01D 11/0203
11,542,438 B1 *    1/2023    Choi ...................... C10G 1/065
(Continued)

FOREIGN PATENT DOCUMENTS

CN          108559543 A   *  9/2018
WO    WO-2018162893 A1   *  9/2018    ............ B01J 23/825

OTHER PUBLICATIONS

Bary Wilson "Hydrothermal Liquid faction for conversion of Mixed Plastic Waste to Fuel", Jun. 19, 2020, Enropower, pp. 1-4. (Year: 2020).*

*Primary Examiner* — Tam M Nguyen
(74) *Attorney, Agent, or Firm* — Jacob M. Ward; Ward Law Office LLC

(57) ABSTRACT

The present disclosure provides a method for regulating a quality of an oil derived from plastic wastes by supercritical hydrothermal liquefaction, including catalyst synthesis, calcination, and supercritical hydrothermal liquefaction. In the present disclosure, a catalyst is prepared by the method, and then applied in regulating the quality of the oil derived from plastic wastes by supercritical hydrothermal liquefaction. This not only reduces cost, but also optimizes a reaction process, such that plastics can be recycled as resources, thereby reducing the carbon emissions and promoting the development of circular economy. The method has strong practicability and functionality, and can be widely used in the technical fields of harmless treatment and resource utilization of plastic waste.

4 Claims, 1 Drawing Sheet

(51) Int. Cl.
  *B01J 23/78* (2006.01)
  *B01J 37/03* (2006.01)

(52) U.S. Cl.
  CPC ............... *C10G 2300/1003* (2013.01); *C10G 2300/4006* (2013.01); *C10G 2300/4012* (2013.01); *C10G 2300/44* (2013.01)

(56) References Cited

U.S. PATENT DOCUMENTS

| | | | |
|---|---|---|---|
| 11,993,519 B2 * | 5/2024 | O'Hare | C01G 9/006 |
| 2016/0207864 A1 * | 7/2016 | Ajiri | C02F 11/06 |
| 2019/0322832 A1 * | 10/2019 | Chen | C08J 11/08 |
| 2021/0069732 A1 * | 3/2021 | Loop | B04C 5/107 |
| 2024/0409827 A1 * | 12/2024 | Van Rossum | C10G 9/36 |
| 2025/0034457 A1 * | 1/2025 | Jamieson | C10L 1/02 |

* cited by examiner

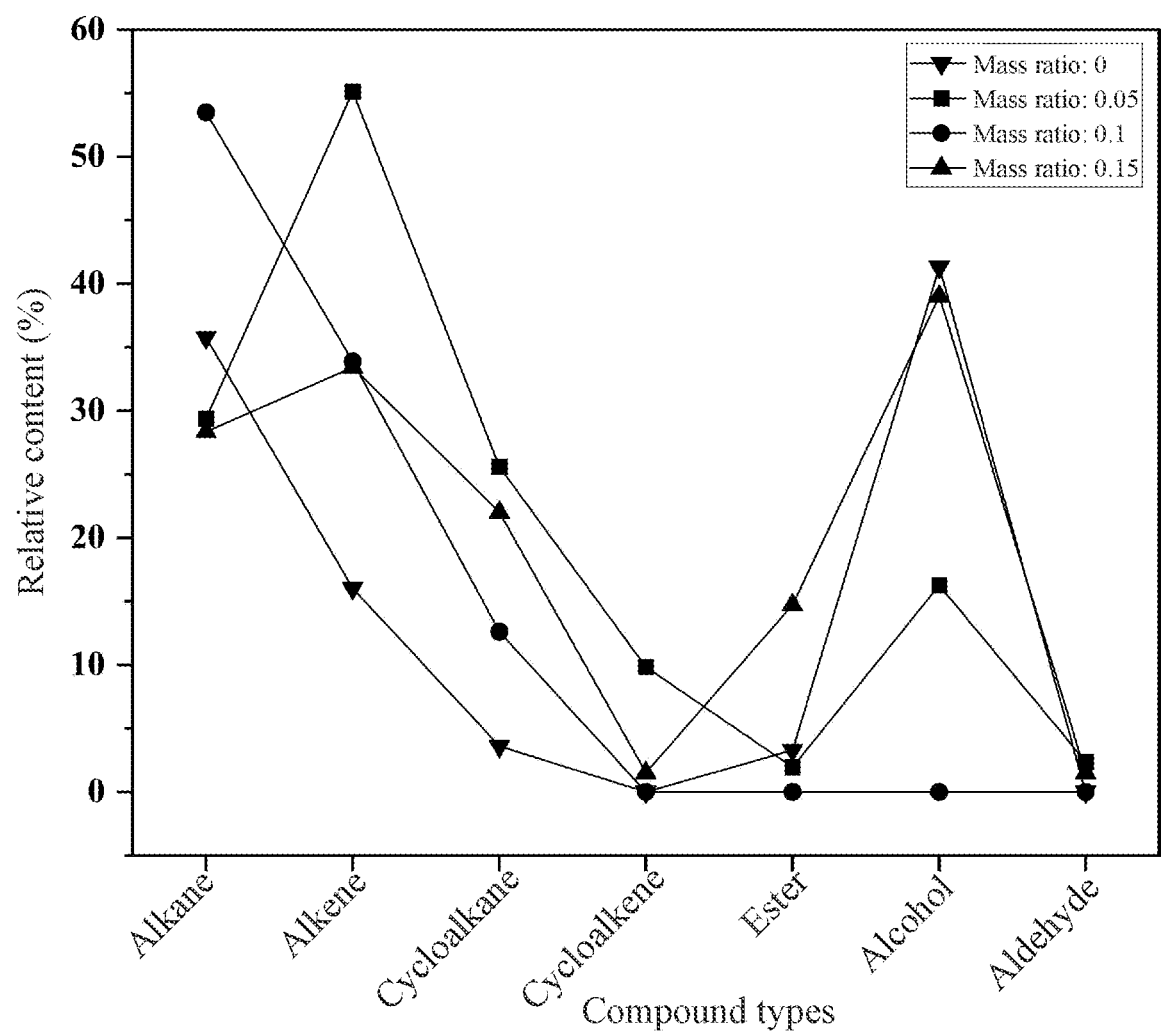

METHOD FOR REGULATING QUALITY OF OIL DERIVED FROM PLASTIC WASTES BY SUPERCRITICAL HYDROTHERMAL LIQUEFACTION

CROSS-REFERENCE TO RELATED APPLICATION

This patent application claims the benefit and priority of Chinese Patent Application No. 202210918980.8, filed with the China National Intellectual Property Administration on Aug. 2, 2022, the disclosure of which is incorporated by reference herein in its entirety as part of the present application.

TECHNICAL FIELD

The present disclosure relates to the technical field of harmless treatment and resource utilization of plastic waste, and specifically refers to a method for regulating a quality of an oil derived from plastic wastes by supercritical hydrothermal liquefaction.

BACKGROUND

Plastic products have brought great convenience to society and have been widely used in agriculture, industry, and construction and other fields. However, the plastic products also cause a large scale of plastic waste accumulation, which brings about the problem of plastic waste disposal. In addition, increased plastic production consumes large amounts of fossil energy since the vast majority of plastics come from fossil fuels.

Existing plastic waste is mainly disposed of through traditional waste landfill, mechanical recycling, and incineration. The waste landfill occupies a large amount of land resources, and has a long plastic decomposition cycle; and decomposed microplastics flow into the soil and rivers, posing a threat to the ecosystem. Mechanical recycling requires sorting according to the type, color, and mass of plastics, and has certain limitations and low recycling efficiency. Incineration is technically simple and can handle most of the plastics; however, the incineration of plastics releases toxic substances that affect human health and pollute the environment. In addition to these three traditional treatment methods for plastic waste, there are new thermal treatment methods such as pyrolysis, vaporization, and hydrothermal liquefaction. These types of methods can convert the plastic waste into fuel oil and other chemical products for secondary use. However, the above methods require relatively high reaction temperature and pressure during the treatment, which have high requirements for equipment performance and have high energy consumption. Moreover, obtained products have poor yield and complex composition. Catalytic pyrolysis adds a certain amount of commercial catalyst on the basis of pyrolysis, thus reducing the temperature required for pyrolysis and improving the yield and quality of pyrolytic tar to a certain extent. Pyrolysis can occur at around 400° C. after adding a commercial catalyst. However, the commercial catalysts are highly priced and costly.

Therefore, it has become an urgent problem to be solved, as well as a hot research topic at home and abroad regarding how to deal with plastic waste cleanly, efficiently, and at low cost. The use of s catalyst can lower the activation energy and facilitate cracking of plastic waste and production of liquid oil. The liquid oil has high calorific value and excellent performance, and shows a potential of replacing petroleum, diesel and other fossil energy sources. Compared with other treatment methods, hydrothermal liquefaction has great advantages. Accordingly, it is of great practical significance and theoretical value to further promote the conversion of plastics into oil and to regulate the quality of oil by adding low-cost catalysts prepared by synthesis using hydrothermal liquefaction.

SUMMARY

In view of the above problems, the present disclosure provides a method for directional regulation and control of a quality of a plastic liquefied oil by a supercritical solvent. The method reduces the energy consumption of plastic treatment, improves the yield and quality of liquefied oil, and realizes low-carbon economy.

The present disclosure adopts the following technical solutions:

The present disclosure provides a method for regulating a quality of an oil derived from plastic wastes by supercritical hydrothermal liquefaction, including catalyst synthesis, calcination, and supercritical hydrothermal liquefaction.

Preferably, the catalyst synthesis includes the following sub-steps:

1.1) mixing a salt compound including at least one of $Cu^{2+}$, $Zn^{2+}$, and $Fe^{2+}$ with a salt solution including $Mg^{2+}$ and $Al^{3+}$ to allow co-precipitation in an aqueous solution of 0.5 M to 2 M of $Na_2CO_3$ or 0.8 M to 3 M of $NaHCO_3$;

1.2) adding 0 M to 1 M of a NaOH solution or 0 M to 3 M of a $NH_4 \cdot H_2O$ solution during the co-precipitation to adjust a pH value of a co-precipitation reaction environment to 10 to 12;

1.3) during the co-precipitation, keeping a temperature constant at 65° C. to 75° C., conducting stirring at 100 rpm to 300 rpm, and curing for 8 h to 24 h after a precipitate is formed;

1.4) washing the precipitate to neutrality, and then conducting immersion in 0 M to 2 M of a salicylic acid-ethanol solution for 8 h to 24 h; and 1.5) after the immersion is completed, conducting filtration, washing, and drying in sequence to obtain a catalyst.

Preferably, process conditions of the calcination include: the calcination is conducted at a temperature of 450° C. to 700° C. for 4 h to 24 h in an atmosphere of an air environment, and the temperature is obtained by heating at 10° C./min to 30° C./min.

Preferably, the supercritical hydrothermal liquefaction is conducted at 240° C. to 500° C. for 0 h to 4 h in a solvent that is one selected from the group consisting of water, methanol, ethanol, toluene, acetone, and acetic acid; and the catalyst and the plastic waste are at a mass ratio of (0-0.1):1, and the plastic waste and the solvent are at a mass ratio of (0.1-1):1.

Preferably, the plastic waste is a mixture of one, two, or more types of plastics.

Preferably, an incompletely converted plastic waste is subjected to one or a combination of two or more selected from the group consisting of gravity settling, centrifugation, and filter pressing to achieve oil separation.

Compared with the prior art, the present disclosure has the following advantages:

In the present disclosure, the method of the catalyst is lower in cost compared with that of the existing catalyst, and the catalyst has a desirable catalytic effect.

In the present disclosure, the catalyst is added in the supercritical hydrothermal liquefaction, thus reducing the temperature required for the reaction, reducing a use burden of the equipment, and prolonging a working life of the equipment. In this way, the energy consumption is reduced, and the reaction of converting plastic waste into high-quality oil is greatly accelerated.

In the present disclosure, the method does not discharge secondary pollutants, can effectively avoid the accumulation of plastic waste, and enables resource recycling of plastic waste. The method reduces carbon emissions and promotes the development of circular economy, has theoretical and practical significances, and shows desirable application prospects.

BRIEF DESCRIPTION OF THE DRAWINGS

FIG. 1 shows degradation effects of catalyst and plastic with different mass ratios in an example of the present disclosure.

DETAILED DESCRIPTION OF THE EMBODIMENTS

The present disclosure is further described in detail below with reference to the following examples.

As shown in FIG. 1, the technical solutions of the present disclosure are as follows:

The present disclosure provides a method for regulating a quality of an oil derived from plastic wastes by supercritical hydrothermal liquefaction, including catalyst synthesis, calcination, and supercritical hydrothermal liquefaction.

In the present disclosure, the catalyst synthesis includes the following sub-steps:

1.1) mixing a salt compound including at least one of $Cu^{2+}$, $Zn^{2+}$, and $Fe^{2+}$ with a salt solution including $Mg^{2+}$ and $Al^{3+}$ to allow co-precipitation in an aqueous solution of 0.5 M to 2 M of $Na_2CO_3$ or 0.8 M to 3 M of $NaHCO_3$;

1.2) adding 0 M to 1 M of a NaOH solution or 0 M to 3 M of a $NH_4 \cdot H_2O$ solution during the co-precipitation to adjust a pH value of a co-precipitation reaction environment to 10 to 12;

1.3) during the co-precipitation, keeping a temperature constant at 65° C. to 75° C., conducting stirring at 100 rpm to 300 rpm, and curing for 8 h to 24 h after a precipitate is formed;

1.4) washing the precipitate to neutrality, and then conducting immersion in 0 M to 2 M of a salicylic acid-ethanol solution for 8 h to 24 h; and 1.5) after the immersion is completed, conducting filtration, washing, and drying in sequence to obtain a catalyst.

The filtration specifically includes: transferring an immersed precipitate into a funnel with filter paper to allow filtering. The washing is conducted 3 times, and specifically includes: injecting a small amount of water into the funnel, soaking the precipitate through the water, and adding a small amount of water to wash after the water is filtered. The drying specifically includes: drying a washed precipitate in an oven at 105° C. until the mass no longer decreases.

During the calcination, process conditions of the calcination include: the calcination is conducted at a temperature of 450° C. to 700° C. for 4 h to 24 h in an atmosphere of an air atmosphere, and the temperature is obtained by heating at 10° C./min to 30° C./min.

In the present disclosure, the supercritical hydrothermal liquefaction is conducted at 240° C. to 500° C. for 0 h to 4 h in a solvent that is one selected from the group consisting of water, methanol, ethanol, toluene, acetone, and acetic acid; and the catalyst and the plastic waste are at a mass ratio of (0-0.1):1, and the plastic waste and the solvent are at a mass ratio of (0.1-1):1.

In the present disclosure, the plastic waste is a mixture of one, two, or more types of plastics.

In the present disclosure, an incompletely converted plastic waste is subjected to one or a combination of two or more selected from the group consisting of gravity settling, centrifugation, and filter pressing to achieve oil separation.

With reference to FIG. 1, the distribution rules of the degradation products obtained during the degradation of the catalyst and the plastic waste at a ratio of 0, 0.05:1, 0.1:1, and 0.15:1 are given. As shown in FIG. 1, in degrading plastic waste using the technical solutions proposed by the present disclosure, the catalyst prepared by the method of the present disclosure can obtain different carbon-containing organic substances from catalyzed plastic waste, thereby achieving degradation.

The present disclosure is further described below with reference to specific examples.

The technical solutions proposed by the present disclosure will be specifically described below.

A synthetic method of a catalyst specifically includes the following steps:

a) preparation of a base solution: dissolving a salt compound in deionized water to obtain a metal solution; dissolving NaOH or $NaHCO_3$ in deionized water to obtain an alkaline solution; and dissolving different amounts of $Na_2CO_3$ or $NaHCO_3$ in deionized water to obtain a precipitation solution and an equilibrium solution;

b) mixing and stirring: adding the metal solution and the alkaline solution prepared in step a) to the precipitation solution, and fully stirring at a pH of 10 and a temperature of 55° C. to form a mixture I;

c) crystallization: stirring the mixture I obtained in step b) to allow crystallization for 24 h to obtain a mixture II;

d) precipitation: filtering the mixture II obtained in step c), dispersing in the equilibrium solution and stirring for 1 h, and filtering to obtain a precipitate I;

e) immersion: washing the precipitate I obtained in step d) to neutrality, and then immersing in 0 M to 2 M of a salicylic acid-ethanol solution for 8 h to 24 h to obtain a precipitate II;

f) subjecting the precipitate II immersed in step e) to filtration, washing, and drying to obtain a precipitate III;

g) calcination: calcining the precipitate III treated in step f) in a muffle furnace to obtain a block catalyst; and h) grinding: grinding the block catalyst obtained in step g) into powder in a grinding bowl to obtain a final catalyst.

In step a), metal ions in the metal solution and the deionized water are at a mass ratio of 1:70 to 1:80; an alkali in the alkaline solution and the deionized water are at a mass ratio of 1:20 to 1:30; the $Na_2CO_3$ or $NaHCO_3$ in the precipitation solution and the deionized water are at a mass ratio of 1:70 to 1:80; and the $Na_2CO_3$ or $NaHCO_3$ in the equilibrium solution and the deionized water are at a mass ratio of 1:50 to 1:60.

In steps b) and c), the stirring is conducted at 65° C. to 75° C. and 100 rpm to 300 rpm.

In step f), the drying is conducted at 105° C.

In step g), the calcination is conducted at a temperature of 450° C. to 700° C. for 4 h to 24 h in an atmosphere of an air atmosphere, and the temperature is obtained by heating at 10° C./min to 30° C./min.

The supercritical hydrothermal liquefaction specifically includes the following steps:
a) mixing and stirring: breaking the waste plastic into small particles, adding a certain amount of solvent and catalyst, stirring and mixing evenly to form a mixture; where the plastic waste can be a mixture of one, two or more types of plastics; and the solvent can be any one of water, methanol, ethanol, toluene, acetone, and acetic acid;
b) hydrothermal treatment: transferring the mixture obtained in step a) to an autoclave, setting a target temperature, conducting heat preservation and stirring to complete the supercritical hydrothermal treatment;
c) solid-liquid separation: introducing a solid-liquid mixture obtained after the treatment in step b) into a solid-liquid separation device to complete solid-liquid separation; and
d) preparation of product: subjecting a liquid obtained in step c) to distillation or extraction to obtain an oil product.

In step a), the catalyst and the plastic waste in the feeding device are at a mass ratio of (0-0.1):1, and the plastic waste and the solvent are at a mass ratio of (0.1-1):1.

In step b), the feed mixture in the hydrothermal treatment equipment is conducted at a target temperature of 240° C. to 500° C. for 0 h to 4 h.

In step c), an incompletely converted plastic waste is subjected to one or a combination of two or more selected from the group consisting of gravity settling, centrifugation, and filter pressing to achieve oil separation.

In step d), a liquid obtained after solid-liquid separation is subjected to distillation or extraction to remove a residual solvent to obtain an upgraded oil product.

SPECIFIC EXAMPLES

Example 1 Preparation of Supercritical Hydrothermal Liquefied Polypropylene

Step I: $Cu(NO_3)_2 \cdot 3H_2O$, $Mg(NO_3)_2 \cdot 6H_2O$, and $Al(NO_3)_3 \cdot 9H_2O$ were dissolved in deionized water at a mass ratio of metal ions to deionized water of 1:70.

Step II: 1 M of a NaOH solution was added to a solution obtained in Step I to obtain a reaction system, a pH value of a reaction environment was adjusted to 10, and the reaction system was fully stirred to allow crystallization for 24 h; a resulting mixture was filtered and dispersed in 1 M of a $Na_2CO_3$ aqueous solution, stirred for 1 h and filtered.

Step III: a precipitate obtained in step II was washed with deionized water to neutrality, and then immersed in 1 M of a salicylic acid-ethanol solution for 8 h, where the salicylic acid-ethanol solution was dissolved according to a factor of (0-2) m, and the dissolving was accelerated by stirring with a stirring bar.

Step IV: a precipitate obtained after the treatment in step III was filtered, washed, and dried, calcined in a muffle furnace at 500° C. for 12 h, and a calcined catalyst was ground into a powder to obtain a final catalyst.

Step V: the catalyst and polypropylene were mixed at a mass ratio of 1:10, and polypropylene and water were mixed at a mass ratio of 1:10 to obtain a mixed raw material.

Step VI: the mixed raw material in Step V was added into a reactor, and subjected to hydrothermal treatment at 400° C. for 1 h.

Step VII: a solid-liquid mixture obtained after the treatment in step VI was introduced into a solid-liquid separation device to complete solid-liquid separation.

Step VIII: an obtained liquid was an oil product.

Example 2 Preparation of Supercritical Methanol Liquefied Polypropylene

The operation steps in this example were the same as those in Example 1, thereby obtaining a corresponding high-quality oil.

Example 3 Preparation of Mixture of Supercritical Methanol Liquefied Polyethylene and Polypropylene The operation steps in this example were the same as those in Example 1, thereby obtaining a corresponding high-quality oil.

To sum up, by adopting the technical solutions proposed by the present disclosure, not only a catalyst with low production cost is proposed, but also a catalytic effect is desirable during the implementation.

In the present disclosure, the catalyst is added in the supercritical hydrothermal liquefaction, thus lowering a temperature required for the reaction, reducing a use burden of the equipment, and prolonging a working life. In this way, the energy consumption is reduced, and the reaction of converting plastic waste into high-quality oil is greatly promoted.

In the present disclosure, the method does not discharge secondary pollutants, can effectively avoid the accumulation of plastic waste, and enables resource recycling of plastic waste. The method reduces carbon emissions and promotes the development of circular economy, and shows desirable application prospects.

A corresponding catalyst is prepared by the method proposed by the present disclosure, and then applied to supercritical hydrothermal liquefaction, thus reducing the activation energy of partial reactions during the degradation of plastics and small molecule recombination. In this way, required temperature conditions for the reaction are lowered and an oil yield is increased. The oil is rich in hydrocarbons with concentrated distribution of carbon atoms, thereby achieving the directional regulation of the quality of the oil derived from plastic wastes by supercritical hydrothermal liquefaction.

The present disclosure and the examples thereof are described as above, and the description is not limiting; and what is shown in the examples is only one of the examples of the present disclosure, and the actual content is not limited thereto. All in all, if a person of ordinary skill in the art is inspired by the present disclosure, and designs, without departing from the purpose of the present disclosure, structural modes and embodiments similar to the technical solutions without inventive step, they shall fall within the scope of protection of the present disclosure.

What is claimed is:
1. A method for regulating a quality of an oil derived from plastic wastes by supercritical hydrothermal liquefaction, comprising performing catalyst synthesis and then supercritical hydrothermal liquefaction,
wherein the catalyst synthesis comprises the following steps:

a) dissolving a salt compound comprising at least one of $Cu^{2+}$, $Zn^{2+}$, and $Fe^{2+}$ in deionized water to obtain a metal solution; dissolving NaOH or $NaHCO_3$ in deionized water to obtain an alkaline solution; and dissolving $Na_2CO_3$ or $NaHCO_3$ in deionized water to obtain a precipitation solution and an equilibrium solution;

b) adding the metal solution and the alkaline solution prepared in step a) to the precipitation solution, and subjecting a resulting mixture to stirring at a pH of 10 and a temperature of 10° C. to 55° C. to form a mixture I;

c) subjecting the mixture I obtained in step b) crystallization under stirring for 24 h to obtain a mixture II;

d) subjecting the mixture II obtained in step c) to filtering, dispersing in the equilibrium solution and stirring for 1 h, and then filtering to obtain a precipitate I;

e) washing the precipitate I obtained in step d) to neutrality, and then immersing in a salicylic acid-ethanol solution having a concentration of 1 M to 2 M for 8 h to 24 h to obtain a precipitate II;

f) subjecting the precipitate II obtained in step e) to filtration, washing, and then drying to obtain a precipitate III;

g) subjecting the precipitate III obtained in step f) to calcination in a muffle furnace to obtain a block catalyst; and h) grinding the block catalyst obtained in step g) into powder in a grinding bowl to obtain a catalyst;

wherein the supercritical hydrothermal liquefaction comprises the following steps:

1) Breaking a waste plastic, adding a solvent and the catalyst, subjecting an obtained mixture to stirring and mixing to form a first mixture; where the plastic waste is a mixture of one, two or more types of plastics; and the solvent is at least one selected from the group consisting of water, methanol, ethanol, toluene, acetone, and acetic acid;

2) transferring the first mixture obtained in step 1) to an autoclave, and conducting the supercritical hydrothermal treatment at a temperature of 240° C. to 400° C. for 1 h to 4 h under stirring;

3) introducing a solid-liquid mixture obtained after the supercritical hydrothermal treatment in step 2) into a solid-liquid separation device to obtain a liquid; and 4) subjecting the liquid obtained in step 3) to distillation or extraction to obtain an oil product.

2. The method for regulating a quality of an oil derived from plastic wastes by supercritical hydrothermal liquefaction according to claim 1, wherein the calcination is conducted at a temperature of 450° C. to 700° C. for 4 h to 24 h in an atmosphere of an air environment, and the temperature is obtained by heating at 10° C./min to 30° C.–/min.

3. The method for regulating a quality of an oil derived from plastic wastes by supercritical hydrothermal liquefaction according to claim 2, a mass ratio of the catalyst to the plastic waste is in a range of 0.1:1, and a mass ratio of the plastic waste to the solvent is in a range of (0.1-1):1.

4. The method for regulating a quality of an oil derived from plastic wastes by supercritical hydrothermal liquefaction according to claim 1, wherein an incompletely converted plastic waste is subjected to one or a combination of two or more selected from the group consisting of gravity settling, centrifugation, and filter pressing to achieve oil separation; and a liquid obtained after solid-liquid separation is subjected to distillation or extraction to remove a residual solvent to obtain an upgraded oil product.

* * * * *